UNITED STATES PATENT OFFICE.

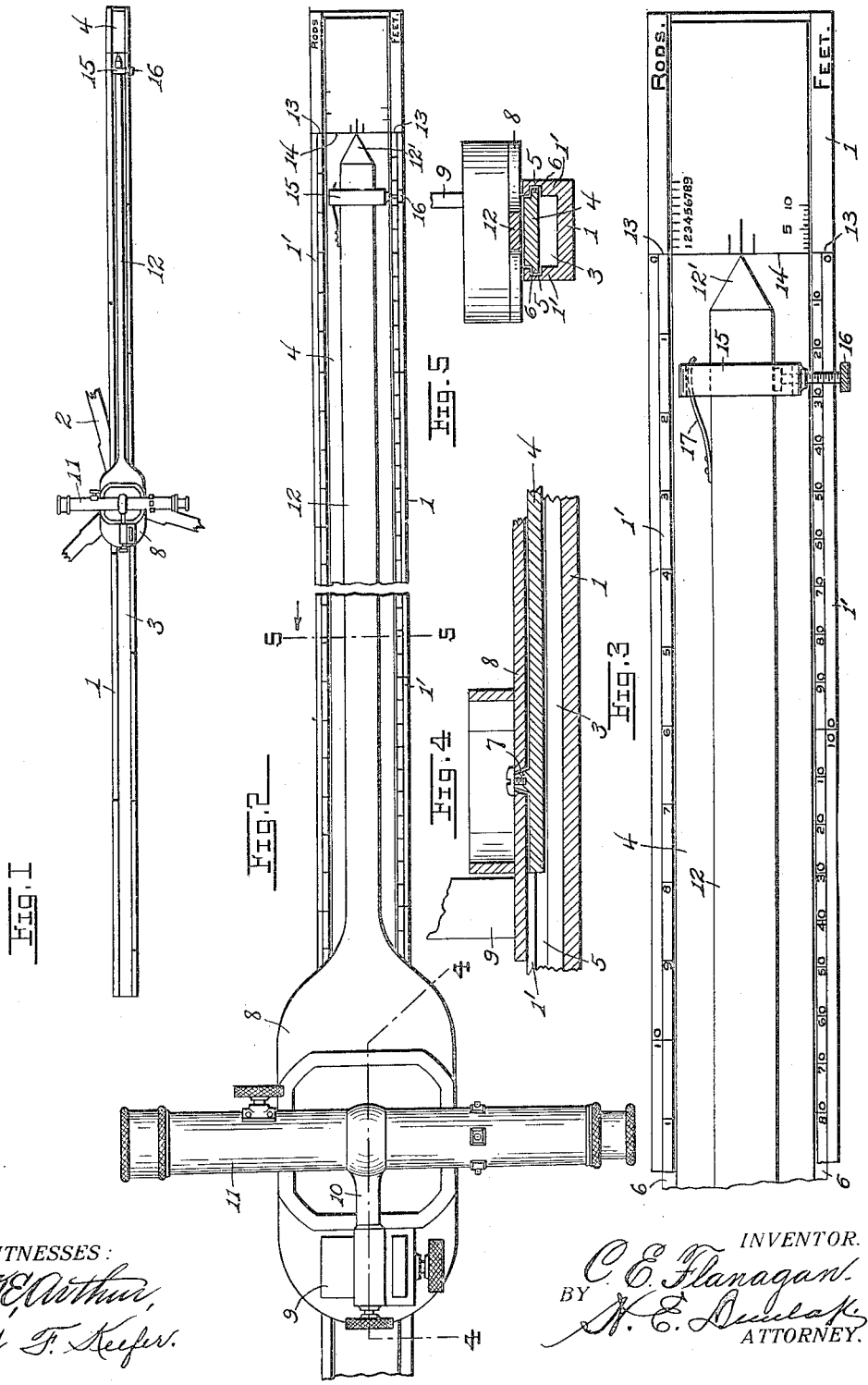

CHARLES E. FLANAGAN, OF WHEELING, WEST VIRGINIA.

DISTANCE-MEASURING DEVICE.

1,140,895. Specification of Letters Patent. Patented May 25, 1915.

Application filed January 19, 1915. Serial No. 3,025.

*To all whom it may concern:*

Be it known that I, CHARLES E. FLANAGAN, a citizen of the United States of America, and resident of Wheeling, county of Ohio, and State of West Virginia, have invented certain new and useful Improvements in Distance-Measuring Devices, of which the following is a specification.

This invention relates broadly to distance measuring devices, and it has for its primary object to provide an instrument whereby the distance between an observing point and a distant object may be more or less accurately determined.

A further object of the invention is to provide a simple instrument or device embodying means whereby the distance of an observed object is indicated thereon in readable terms or in terms readily translatable into terms of length.

A further object is to provide an instrument of the character mentioned which is particularly designed for use in surveying and like topographic work and which is of such convenient size and shape that it may readily be transported from place to place.

With these and other objects in view, the invention resides in the features of construction, arrangement of parts and combinations of elements which will hereinafter be fully described, reference being had to the accompanying drawings, forming a part of this specification, in which—

Figure 1 is a top plan view of the invention; Fig. 2 is a similar view, enlarged, of a portion of the instrument; Fig. 3 is a similar view of a broken portion of the device, still further enlarged, illustrating a preferred arrangement of graduations; and Figs. 4 and 5 are sections taken respectively on the lines 4—4 and 5—5, Fig. 2.

Referring to said drawings, in which like designating characters distinguish like parts throughout the several views—1 indicates a bar which may be of any preferred length, but which, for convenience in transporting by hand from place to place, should probably not exceed six feet in length. Said bar is designed to be mounted centrally upon a tripod 2, or other appropriate support, and to occupy a horizontal position. Provided in the upper face of said bar and extending longitudinally thereof is a channel 3 in which is mounted an adjustable plate or slide 4 of a suitable length, as about 30 inches, guide-grooves 5 being provided in the upright flanges 1' of said bar, and corresponding laterally disposed tongues 6 formed on said slide 4 being slidably disposed in said grooves.

Pivotally mounted upon the upper face of the slide adjacent to the rear end of the latter, as shown, for example, at 7 in Fig. 4, is a plate 8 having mounted thereon a stationary upright support 9 on which is mounted a forwardly directed vertically adjustable arm 10; and mounted upon and in fixed relation to the forward end of said arm is a telescope 11. Also carried by the plate 8, or formed integral therewith, is a forwardly directed arm or pointer 12, said telescope and said pointer being permanently disposed at right angles to each other.

Graduations of an appropriate character are provided on the upper edges or faces of the flanges 1', those herein shown on one of said edges being preferably arranged to designate distances in rods while those shown on the opposite edge are arranged to designate distances in feet, said graduations beginning at lines 13 indicating zero, which lines, in the initial position of the slide 4, register with a transverse line 14, hereinafter termed the indicator line, provided on the face of said slide at a point adjacent to the front end of the latter.

Rigidly mounted upon the slide 4 at a point slightly in the rear, or to the left, of the indicator line 14, is a keeper 15 through which the point 12' of the pointer 12 projects and within which said pointer is adjustable laterally, a micrometer adjusting screw 16 being directed laterally through one side of said keeper and having its point resting against the adjacent side or edge of said pointer, while a suitably disposed spring 17 exerts a yielding pressure against the opposite side or edge of said pointer for maintaining the latter in permanent contact with said micrometer screw.

Suitable transversely arranged graduations may be provided on or along the indicator line 14 to provide means for determining the distance the pointer is moved during its adjustment; but, for greater accuracy, it is preferred that a screw 16 be used having fine micrometer threads providing a definite adjustment with each revolution thereof.

In practice, to determine the distance from the sighting point to a distant object, the instrument is mounted in a horizontal position and the telescope is trained on the object, the slide 4 having been first moved to its initial position, wherein the zero lines 13 register with the indicator line 14, and the pointer having been adjusted to the center of said indicator line, as shown in Figs. 1, 2 and 3, said indicator line being located at a known fixed distance, as, for instance, 30 inches from a vertical line intersecting the axial lines of the telescope and the pointer and passing through the pivot 7. Then, by means of the micrometer screw 16, the pointer is moved toward the operator a definite distance, as one-tenth inch. The ratio of adjustment to that of the distance between the indicator line and the vertical line passing through the pivotal point 7 and the axes of the telescope and pointer, as above mentioned, being one-tenth to thirty, it is readily determined that the ratio of the length of movement of slide 4, necessary to again bring the object in the line of sight of the telescope, to the distance between the sighting point and the object is one inch to 300 inches. The slide 4 is then moved to the left along the bar 1 until the object is again sighted through the telescope. At this point the position assumed by the indicator line 14 on the scale renders readable, or readily calculable, the distance to the object. Assuming, for example, that said indicator line registers with the scale indication 100 on the side representing feet, it is instantly seen that the object is 100 feet distant from the sighting point. In the instrument, as herein shown, the scale graduations are laid off for indicating distances in a directly readable manner requiring no calculation. With such scale graduations it is of course necessary that the pointer be adjusted a certain definite distance, as one-tenth inch, in making all measurements. However, if the pointer is moved a different distance, a simple calculation may be resorted to for determining the distance to the object; as, for instance, assuming the scale reading to be based on one-tenth inch pointer adjustment, if the pointer be adjusted one-twentieth inch instead of one-tenth, the scale readings have only to be doubled. The scale may be graduated in inches and fractions thereof, as an ordinary rule, if desired; in which case the distance between the sighting point and the distant object may be readily determined or calculated. Assuming, for example, that the indicator is 30 inches distant from the vertical line through the telescope, as hereinbefore mentioned, that the pointer is adjusted laterally one-tenth inch, and that, when the slide has been moved to its second position, the indicator line registers with a scale indication which is 4 inches distant from the zero line or indication, a simple equation is presented which, expressed algebraically, is $$\frac{4}{x} = \frac{1}{300};$$

from which it will be readily calculated that the object is distant 1200 inches, or 100 feet.

From the above it will be understood that any preferred character of scale graduations may be employed in the instrument. I therefore do not desire to limit myself to any particular character of scale graduations.

What is claimed is—

1. A distance measuring device comprising a bar having a graduated scale thereon, a slide adjustable longitudinally with respect to said bar, a plate pivotally mounted on said slide, a pointer carried in fixed relation to said plate and overlying said slide, means for adjusting said pointer laterally, causing said plate to turn on its pivot, a telescope mounted over said plate and permanently disposed at a right angle to said pointer, and means carried by said slide adapted to indicate graduations on the bar.

2. A distance measuring device comprising a bar having distance indicating graduations thereon, a member movable longitudinally with respect to said bar, a member pivotally mounted on the first mentioned member and adjustable with respect to the latter, an indicator device carried by said first mentioned member at a fixed distance from the pivotal connection of the second member, and a telescope carried by and permanently disposed at a right angle to said second member, said telescope being so located that its line of sight is permanently intersected by a vertical line passed through said pivotal connection.

3. A distance measuring device comprising a bar having distance indicating graduations thereon, a slide adjustable longitudinally with respect to said bar, a member pivoted on said slide and adapted for partial rotation on said pivot in a horizontal plane, means for adjusting the distance of such rotation, an indicator device carried by said slide at a definite distance from said pivot, said device being adapted to indicate graduations on said bar at all points in the adjustment of said slide, and a telescope carried by and permanently disposed at a right angle to said pivoted member, said telescope having its line of sight permanently intersected by a line passed through said pivot.

4. A distance measuring device comprising a bar having distance indicating graduations thereon, a slide adjustable longitudinally with respect to said bar, a plate pivoted on said slide and adapted for partial rotation on said pivot in a horizontal plane, a pointer carried in fixed relation to said plate and overlying said slide, means for adjusting said pointer to effect a definite partial rotation of said plate, an indicator device carried by said slide at a definite distance from said pivot, said device being adapted to indicate graduations on said bar at all points in the adjustment of said slide, and a telescope carried by said plate and occupying a position at a right angle to the slide when said plate occupies its normal or initial position, said telescope having its line of sight permanently intersected by a line passed through said pivot.

5. A distance measuring device comprising a bar having distance indicating graduations thereon, a slide adjustable longitudinally with respect to said bar, a plate pivoted on said slide and adapted for partial rotation on said pivot in a horizontal plane, a micrometer adjusting means whereby said plate is rotated a definite distance, an indicator device carried by said slide at a definite distance from said pivot, said device being adapted to indicate graduations on said bar at all points in the adjustment of said slide, and a telescope carried by said plate and occupying a position at a right angle to the slide when said plate occupies its normal or initial position, said telescope having its line of sight permanently intersected by a line passed through said pivot.

In testimony whereof, I affix my signature in presence of two subscribing witnesses.

CHARLES E. FLANAGAN.

Witnesses:
W. F. KEEFER,
H. E. DUNLAP.

Copies of this patent may be obtained for five cents each, by addressing the "Commissioner of Patents, Washington, D. C."